No. 853,599. PATENTED MAY 14, 1907.
F. X. ROCH & A. O. BONNIN.
CLOTHES LINE SUPPORT.
APPLICATION FILED NOV. 20, 1905.
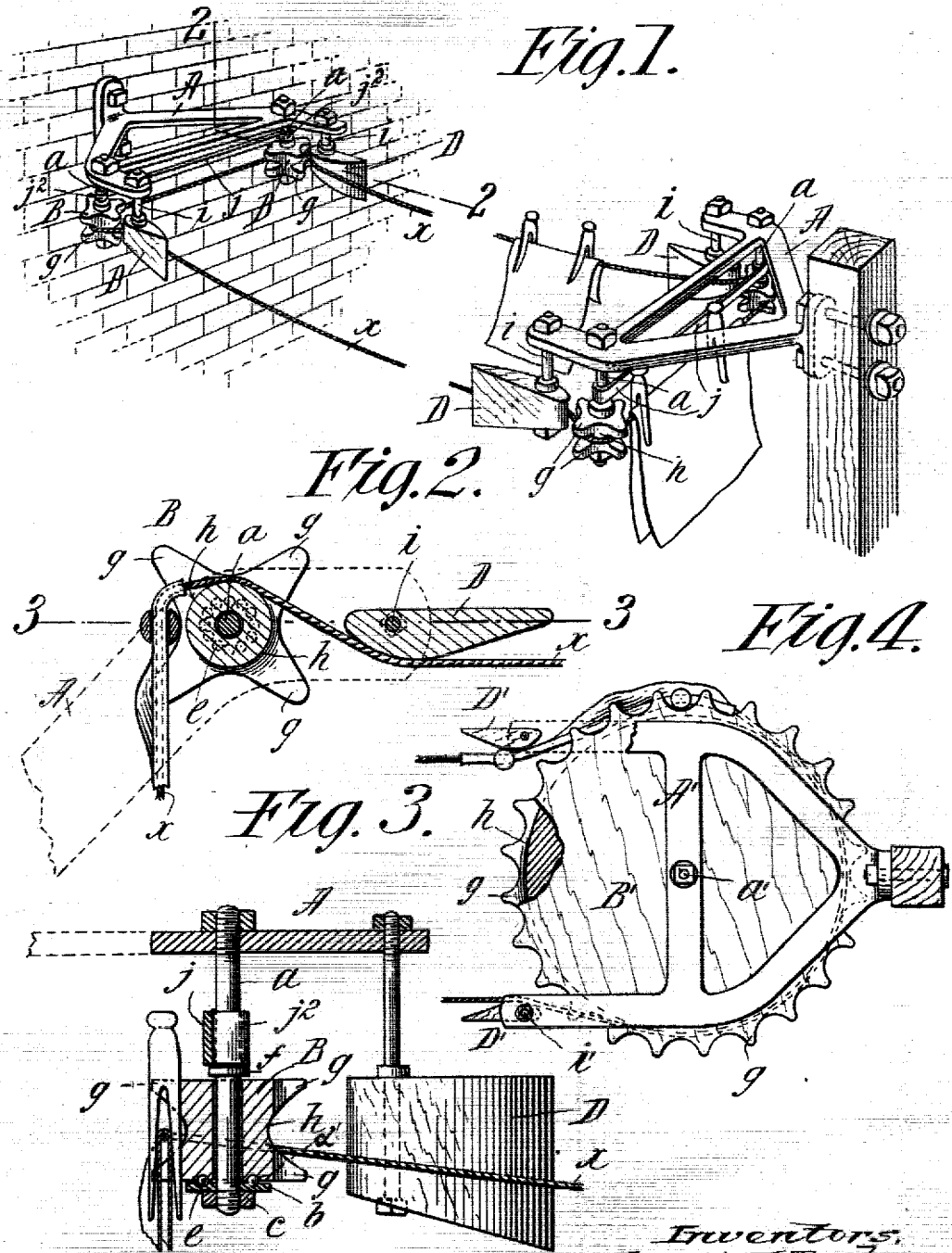
Witnesses:
Inventors,
Francis X. Roch,
and Alfred O. Bonnin,
by Attorney.

UNITED STATES PATENT OFFICE.

FRANCIS X. ROCH AND ALFRED O. BONNIN, OF HOLYOKE, MASSACHUSETTS; SAID BONNIN ASSIGNOR TO SAID ROCH.

CLOTHES-LINE SUPPORT.

No. 853,599.

Specification of Letters Patent.

Patented May 14, 1907.

Application filed November 20, 1905. Serial No. 288,123.

*To all whom it may concern:*

Be it known that we, FRANCIS X. ROCH, a British subject, and ALFRED O. BONNIN, a citizen of the United States of America, and both residents of Holyoke, in the county of Hampden and State of Massachusetts, have invented certain new and useful Improvements in Clothes-Line Supports, of which the following is a full, clear, and exact description.

This invention relates to improvements in that class of apparatus or appliances for affording such supports of an endless clothes line as to permit the line to have a running or progressive movement whereby the clothes or articles to be dried, may be one after another secured on the line by clothes pins at any given point, and readily removed from the line, such arrangements being more particularly advantageous in cities, and other places where an ample yard space for drying on strung clothes lines is not available.

The object of the invention is to provide an apparatus of the general class indicated which is simple and inexpensive of construction, desirable and not liable to derangement after protracted use, and entirely convenient and efficient in operation.

The invention consists in coöperative arrangements or combinations of parts and the constructions of certain of the parts all substantially as hereinafter fully described and set forth in the claims.

The improved apparatus is illustrated in the accompanying drawings, in which,—Figure 1 is a perspective view of a full set of the improved appliances properly set up and as in use. Fig. 2 is a horizontal sectional view of a portion of the device as taken on the line 2—2, Fig. 1. Fig. 3 is a vertical sectional view substantially on the line 3—3, Fig. 2. Fig. 4 is a plan view of a modified form of one of the fixtures or appliances comprising features in accordance with this invention.

In the drawings,—A represents a supporting bracket for each of the appliances of which in equipment for use two are provided at suitably distant locations, as represented in Fig. 1. Each bracket is of any suitable design and horizontally wide shape, and in the preferred form of the appliances represented in Fig. 1, each bracket is fork-shaped and has a pair of opposite and separated depending posts or studs $a$ supported from the arms of the bracket, each post or stud being formed or provided near its lower end with a flange-like rest $b$ which, as shown, is constituted by a washer or annular plate held at the lower extremity of the stud by the nut $c$ screwing on the threaded end portion of such stud. On the said studs supported for rotation in opposition and in the same horizontal plane are two wheels or sheaves B formed as shown in Fig. 3 with grooves $d$ in their bottoms,— between which annular grooved surfaces and the flange-like rests $b$ are series of anti-friction balls $e$.

The studs have shoulders $f$ closely to the upper flat faces of the wheels to prevent upward displacement of the latter and the escape of the balls. Each of said wheels has circumferentially separated, edgewise projecting teeth $g$ in pairs, a tooth of each pair being vertically above and separated from its companion tooth, leaving a continuous peripheral surface $h$, for easy running of the clothesline $x$ between the upper and lower series of the teeth. A stretch of the clothesline coming to and running partially around one of the wheels B thence has a traversing course to and partially around the other wheel, and having its further continuation for an indefinite distance according to the separation of both appliances of a set parallel with the first stretch of line. Located in advance of the wheels B, B, of each of the fixtures, but suitably adjacent thereto, are a pair of fixed guards D, D, for constraining the clothesline and guiding the clothes pins in proper running engagement around said wheels, said guards each comprising a substantially wedge-shaped block having a smooth and somewhat convex inwardly facing side, as shown; and they are supported on depending studs $i$ $i$ sustained by and extending vertically below the bracket.

$j$ represents a clothespin guard horizontally arranged by being supported by and extending from one of the wheel studs $a$ to the other in a line above the plane of rotation of the wheels and yet suitably near to such plane as to prevent the heads or upper portions of the clothespins from swinging around to more or less nearly horizontal positions on or with the line to interfere with their proper rounding of the wheels.

As indicated, the clothesline guard consists of a flat strip of metal edgewise vertical and having its ends formed with loops or eyes $j^2$ to embrace the wheel studs $a$. The action and utility of these appliances are manifest, it being readily perceived that as the line having articles to be dried and secured thereon by clothespins, are advanced with the line which runs around the smooth intermediate peripheral portions of the wheels the teeth of the wheels engage,—or the vertical spaces between the teeth of the wheels accommodate,—the clothespins.

The making of the structure as shown in Fig. 1 is preferable as it enables the use of comparatively small light inexpensive and easily constructed wheels which however may be so widely spaced as to keep the opposite runs of the clothesline separated as much as is desirable, but by making each of the fixtures or appliances to comprise but a single wheel of much larger diameter substantially the same results are accomplished.

The single wheel construction is illustrated in Fig. 4 in which the reference letter "A'" indicates one of the brackets; B' the wheel journaled on pin $a'$, and D' the fixed guards which are carried by the posts $i'$, depending from the ends of the arms of the bracket A'.

We claim:—

1. A clothes line support comprising a bracket member, a stud depending therefrom, a wheel journaled on said stud, and a fixed guard located in advance of and closely adjacent said wheel, said guard comprising a substantially wedge-shaped block having a convex wall.

2. In an apparatus of the character described, a forked bracket, a pair of depending studs supported from each arm of the bracket, a toothed wheel journaled on one of the studs of each arm, and a substantially wedge-shaped guard-block fixed to each of the other studs, each block having a convex side wall facing the corresponding wall of the opposite block.

3. In an apparatus of the character described, a bracket member, two pairs of oppositely disposed studs secured to and depending from said bracket, one stud of each pair being located adjacent to and directly in advance of the other, a toothed wheel journaled on one of the studs of each pair, and a substantially wedge-shaped guard-block fixed to each of the other studs, said blocks being vertically disposed and having their narrower ends directed outwardly away from the toothed wheels.

4. In an apparatus of the character described, in combination a horizontal bracket having opposite and separated depending posts or studs, a pair of wheels supported by and rotatable on said depending studs in a common horizontal plane, each of said wheels having circumferentially separated edgewise projecting teeth in pairs, one of the teeth of each pair being vertically above and separated from its companion tooth, and a horizontal clothespin guard comprising a vertically disposed metallic strip supported at its opposite ends by and extending from one of said studs to the other in a horizontal line above the plane of rotation of said wheels.

5. In an apparatus of the character described, in combination a horizontal bracket having opposite and separated depending posts or studs, a pair of wheels supported by and rotatable on said depending studs in a common horizontal plane, each of said wheels having circumferentially, separated, edgewise projecting teeth, in pairs, and another pair of depending studs or supports having substantially wedge-shaped fixed guards located adjacent and in the plane of the edges of said wheels for constraining the clothesline for its proper and running engagement around said wheels.

6. In an apparatus of the character described, in combination a horizontal bracket having opposite and separated depending posts or studs, a pair of wheels supported by and rotatable on said depending studs in a common horizontal plane, each of said wheels having circumferentially, separated, edgewise projecting teeth, in pairs, and another pair of depending studs or supports having fixed wedge-shaped guards adjacent and in the plane of the edges of said wheels for constraining the clothesline for its proper running engagement around said wheels, and a horizontal clothespin guard consisting of a metallic strip supported at its opposite ends by and extending from one of said studs to the other in a horizontal line above the plane of rotation of said wheels.

Signed by us at Springfield, Mass., in presence of two subscribing witnesses.

FRANCIS X. ROCH.
ALFRED O. BONNIN.

Witnesses:
Wm. S. Bellows,
G. R. Driscoll.